United States Patent [19]

Argo et al.

[11] 4,249,918

[45] Feb. 10, 1981

[54] FIBER BED ELEMENT AND PROCESS FOR REMOVING AEROSOLS FROM GASES

[75] Inventors: Wesley B. Argo, Town and Country; Babur M. Kocatas, Clayton; S. A. Ziebold, Mehlville, all of Mo.

[73] Assignee: Monsanto Company, St. Louis, Mo.

[21] Appl. No.: 41,120

[22] Filed: May 21, 1979

[51] Int. Cl.³ .............................................. B01D 46/02
[52] U.S. Cl. ......................................... 55/97; 55/488; 55/529; 55/DIG. 25; 210/491; 210/505
[58] Field of Search .................. 55/97, 486, 487, 498, 55/527, 528, 529, DIG. 25, 488, 489; 210/491, 505; 428/294, 297, 298

[56] References Cited

U.S. PATENT DOCUMENTS

| | | | |
|---|---|---|---|
| 2,143,016 | 1/1939 | Kleinschmidt | 55/527 |
| 2,476,582 | 7/1949 | Browne et al. | 55/527 |
| 2,537,897 | 1/1951 | Hunter | 55/529 |
| 2,692,654 | 10/1954 | Pryor | 55/527 |
| 2,910,763 | 11/1959 | Lauterbach | 55/527 |
| 3,540,190 | 11/1970 | Brink, Jr. | 55/97 |
| 4,048,075 | 9/1977 | Colvin | 210/484 |
| 4,086,070 | 4/1978 | Argo et al. | 55/97 |

FOREIGN PATENT DOCUMENTS

43-20540 9/1968 Japan.
45-23280 8/1970 Japan.

*Primary Examiner*—David L. Lacey
*Attorney, Agent, or Firm*—Lawrence L. Limpus

[57] ABSTRACT

A fiber bed element and process for removing aerosols from gas streams wherein a bed of fibers is packed to a desired packing density between two foraminous screens. A substantial portion of the fibers in the bed are positioned in a generally parallel arrangement such that the element can be mounted in an operative position with such substantial portion of the fibers extending in a generally vertical direction to enhance drainage of collected aerosols from the element to thereby allow operation at even high bed velocities with reduced re-entrainment of collected liquid and thereby increase the total collection efficiency of the element. In the process, the bed element is mounted such that the parallel fibers extend in a generally vertical direction and the gas to be treated is passed through the bed at a predetermined velocity.

10 Claims, 4 Drawing Figures

FIBER BED ELEMENT AND PROCESS FOR REMOVING AEROSOLS FROM GASES

BACKGROUND OF THE INVENTION a. Field of the Invention

This invention relates to fiber bed elements and processes for removing aerosols from gas streams.

b. Description of the Prior Art

It is known to utilize fibers to make fiber bed elements for removing mists or aerosols from gas streams. In the prior art, the fibers are packed in a substantially randomly distributed manner. The gas to be treated is passed through the fiber bed, with the aerosol droplets being captured by the fibers in the bed. The moving gas urges the captured droplets toward the downstream face of the fiber bed, where the droplets coalesce and drain downward under the influence of gravity. Generally, reasonably high collection efficiencies can be achieved with a fiber bed element of this type.

We have found that, all other parameters of fiber bed design and operating conditions being equal, even higher collection efficiencies can be achieved by forming a fiber bed in such a manner that a substantial portion of the void spaces between the fibers in the fiber bed extend, with substantial continuity, generally in a vertical direction. In the process described herein, such a fiber bed element is mounted in an operative position with such voidage extending in a generally vertical direction and the gas to be treated is passed through the bed substantially normal thereto. This positioning of the fiber bed element results in much improved drainage of the collected aerosols, thereby reducing re-entrainment of collected aerosols and thus improving the collection efficiency.

SUMMARY OF THE INVENTION

The fiber bed element of this invention comprises a bed of fibers packed to a predetermined density with a substantial portion of the voidage between the fibers of the fiber bed extending, with substantial continuity, in a generally vertical direction as hereinafter defined. In one embodiment, this generally vertical orientation of the voidage is obtained through use of a fiber bed in which a majority of the fibers comprising such fiber bed are disposed in a generally vertical direction.

In a more preferred embodiment, the fiber bed is made up of a continuous length of fibrous roving with a majority of the fibers therein disposed in a generally vertical direction, such roving being formed by layering a plurality of thin continuous sheets of fibers (with the majority of the fibers thereof extending generally in the longitudinal or machine direction of such continuous sheets) to form a mat and then folding such mat along its longitudinal axis to form a continuous roving. In the process of this invention such fiber bed is mounted in an operative position with such voidage extending in a generally vertical direction and the gas to be treated is passed through the fiber bed element generally normal thereto. This positioning of the voidages improves drainage of the collected aerosols to reduce re-entrainment and thereby improve collection efficiency.

DETAILED DESCRIPTION OF THE INVENTION

Figure 1:
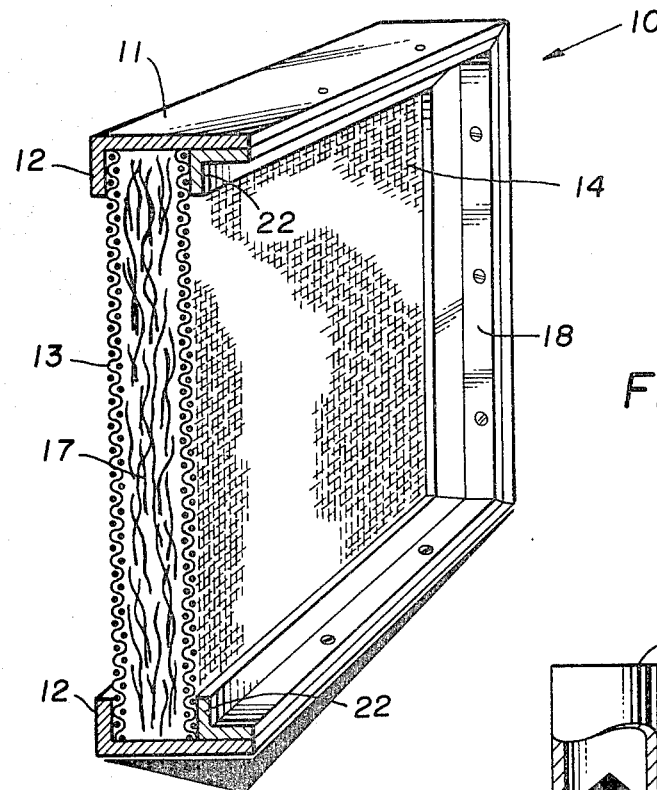
FIG. 1 of the drawing shows a perspective view of one embodiment of the fiber bed element of this invention with portions cut away to show the positioning of the various parts making up the element.

Referring now in detail to the drawing, there is shown a fiber bed element 10 made up of a flat rectangular frame 11 having a flange 12, the edges of the flange 12 forming an opening through which a gas to be treated can be passed. Positioned inside the frame 11 are a pair of foraminous screens 13 and 14 positioned on opposite sides of a bed 17 of fibers. A clamping element 18 is positioned in the frame 11 and held in position by screws 19. The clamping element 18 is provided with a flange 22 which engages the screen 14 and cooperates with the flange 12 to hold the screens 13 and 14 and the fiber bed 17 in an assembled position, the screens being sufficiently rigid to maintain the fibers at a desired packing density. A stiff wire mesh is a suitable material for use as screen 13 and 14.

The element 10 is used to collect aerosols or mists from a gas passed through the element. As the gas moves through the element, mist or aerosol particles in the gas contact fibers in the element and are captured. The gas stream applies a force to the collected mist particles to urge these particles toward the downstream side of the fiber bed 17. These mist particles coalesce within the fiber bed 17 and drain down through the voidages in the fiber bed under the influence of gravity to be removed. The fibers in the element are preferably packed to a density such that most of the drainage of the collected mist, in liquid form, occurs in the downstream side of fiber bed 17.

The fiber bed element 10 is used in conjunction with other apparatus which is adapted to direct a gas to be treated through the bed element and to drain off the collected aerosol in liquid form. This appurtenant apparatus is not shown for the reason that other apparatus for use with flat bed mist collectors is well known to those skilled in the art.

The fibers making up fiber bed 17 are not randomly distributed, as in prior art elements, but instead the majority of the fibers are disposed in a generally parallel arrangement such that the element can be mounted in an operative position with the mean fiber direction being generally vertical.

With respect to the voidage in the fiber bed, the term "generally vertical" is intended to mean that a substantial portion, and preferably the majority, of the void spaces between fibers in the fiber bed extend with the long dimension of their free volume running vertically up to about 15° from the vertical.

The relationship between the generally vertical orientation of the voidage and the orientation of the fiber required to produce such result will be obvious to those skilled in the art. Thus, when the terms "generally vertical" or "generally parallel" are used herein with respect to the fibers, we mean that the fibers or filaments are positioned such that a majority thereof are disposed generally vertically.

In the preferred embodiment using continuous lengths of roving formed by layering thin continuous sheets of fibers to form a mat or blanket which is folded along its longitudinal axis, the term "generally vertical" means that the fibers or filaments of the fiber bed are positioned so that a majority thereof are disposed such that the vertical (i.e., along the longitudinal axis of the roving) extension of individual fibers or filaments is not substantially restricted whereas, the extension of the fibers or filaments disposed at right angles thereto is restricted.

Figure 4:
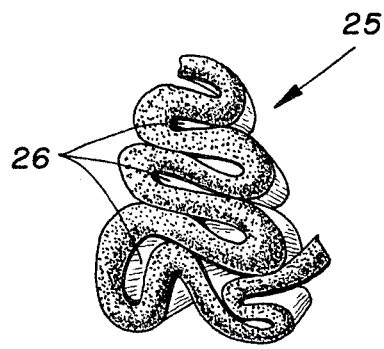
FIG. 4 is an enlarged cross-sectional view of the preferred roving used to make the fiber bed element of this invention, showing longitudinal passageways in the uncompacted roving prior to forming the bed element.

In one example of such roving, the fibers are assembled in the form of a roving 25, best shown in FIG. 4. The roving is made by forming a blanket (not shown) consisting of a plurality of thin layers (not shown) of staple fibers in which the fibers are distributed in the two dimensional plane of the thin layer with a majority of the individual fibers or filaments having an orientation within ±30° (and preferably ±20°) of the longitudinal (i.e., machine) direction of the roving. The blanket may contain, e.g., 40–50 of these thin layers, with the amount of fiber in each layer being e.g., 2.0 to 3.5 grams per square meter.

The blanket, which is formed in a continuous manner, has a continuous length and may have a width of up to about one-half meter or more, depending upon the amount of fiber desired in the finished roving after the layers have been assembled to form the blanket. The blanket is folded along its longitudinal axis a number of times to form the roving 25. FIG. 4 shows the cross-sectional configuration of the roving. Mechanical integrity of the roving is obtained with a filament or group of filaments (not shown) spirally wrapped around the roving to hold it together; or, alternatively, by slightly twisting the roving around its longitudinal axis.

It will be noted that the folding of the blanket to form the roving results in restricting the extension of individual fibers or filaments disposed as substantially right angles to the longitudinal axis of the roving, but does not restrict the extension of the fibers or filaments running generally parallel to the longitudinal axis. Folding the blanket to form the roving also results in longitudinal passageways 26 (see FIG. 4) which extend in a direction generally parallel to the fibers. There are also longitudinal passages (not shown) between the layers making up the blanket, as well as passages of capillary size associated with, and generally defined by, the individual filaments or fibers which are disposed generally parallel (i.e., ±30°) to the longitudinal axis of the roving. Packing the roving to the densities specified below reduces the size of the larger passageways to an extent—depending on the packing density. These longitudinal passageways will extend in a generally vertical direction when the bed element is mounted in an operative position to further enhance drainage of the collected aerosols.

Despite the reduced size of the larger passageways, the lack of perfect orientation of much of the fibers or filaments in the fiber bed (i.e., those which are not disposed generally parallel to the longitudinal axis of the roving) prevents the elimination of capillary passages along the longitudinal axis. In other words, the fiber bed maintains an open structure with a void fraction of at least 90%.

In another embodiment, fiber beds of this invention can be made from larger diameter fibers which are too stiff to be folded into roving. In such embodiment the fibers are collected as blankets or mats with a thickness preferably no greater than 0.5 to 1 inch (1.25 to 2.5 cm.) which is substantially less than the average fiber or filament length. Such fibers are thus substantially oriented in the two dimensional plane of the mat with the majority thereof running generally parallel (i.e. ±30°) to one axis of the mat. If necessary, a plurality of such mats can be aligned in fiber-to-fiber contact in series to provide a fiber bed of any desired thickness. Generally, individual mats will be sufficiently flexible to be used in a cylindrical element if desired.

The generally vertical positioning of the fibers and passageways enhances drainage from the fiber bed. The improved drainage results in the presence of less collected liquid on the downstream surface of the bed 17. Re-entrainment of collected liquid is a function of the amount of liquid on the downstream surface of the bed 17, so that a reduced amount of liquid on this surface results in less re-entrainment at a given gas velocity. Thus, a higher collection efficiency is achieved at a given gas velocity and loading.

By adjusting the amount of fibers between the screens 13 and 14 or by adjusting the position of the clamping element 18, the density of packing of the bed 17 can be varied. The bed 17 should be compressed to a density of 80 to 320 Kg per cubic meter and preferably to 130 to 210 Kg per cubic meter.

Although the drawings show the fiber bed packed between two support screens, this invention is not so limited. As is well known to those skilled in the art, various means are known for the support of a fiber bed and any such means can be used. For example, the fiber bed can be supported on either or both sides by another fiber bed of any type; or in the case of cylindrical elements, if the fiber bed of this invention is not covered by another fiber bed layer, it can be supported around its circumference by either a support screen or, e.g., by wire or cord spirally wrapped around it.

The mean diameter of the fibers making up the bed may vary from about 2 to 300 or more microns, and is preferably in the range of 5 to 200 microns. Mean fiber diameters can readily be ascertained by those skilled in the art by known methods. For example, a standard of the American Society for Testing Materials, ASTM D-568-61, describes one method for determining the diameter of glass fibers.

The minimum mean fiber diameter is limited by the requirement for mechanical stability of the fiber bed; i.e., the fibers should not become matted down during operation which would only serve to increase pressure drop through the fiber, nor should the fibers shift during operation which could lead to channeling and loss of collection efficiency. For glass fibers this minimum mean fiber diameter is about 5 microns.

The actual mean fiber diameter selected will depend upon the intended use of the fiber bed of this invention. For example, in the range of 2 to 15, and preferably 5 to 12, microns mean fiber diameter, the bed will provide high collection efficiency on submicron particulates. In the range of 15 to 75, and preferably 20 to 50, microns mean fiber diameter, the bed will provide high collection efficiency on 1 micron and larger particulates and moderate collection efficiency on submicron particulates at high bed velocities of gas flow. Finally, in the range of 75 to 300, and preferably 150 to 250, microns mean fiber diameter, the bed will serve as a spray catcher type of bed. In each instance, however, the bed will have improved drainage characteristics and can be operated at higher bed velocities with no greater or even less re-entrainment, as compared to conventional fiber beds of equivalent fiber diameter.

The fibers may be made of various materials. For example, the fibers may be made from materials such as nylons, polyesters, metals such as stainless steel and titanium, glass, ceramics, etc. Glass fibers are preferred because of their resistance to chemical attack.

Most frequently, this fiber bed element will be used to remove a liquid aerosol or mist of some liquid from a stream of gas. One example of such a use is the collection of sulphuric acid mist in an acid manufacturing process. This fiber bed element can also be used for recovering aerosols which are in solid form and which are capable of being dissolved by a suitable solvent, such as water. In this operation, the solvent may be applied as a mist in the gas stream at a point upstream of the fiber bed element or may be applied directly to the bed element to irrigate the element and remove the solid aerosols by dissolving them and allowing them to drain downward along the downstream surface of the bed element for removal.

Figure 2:
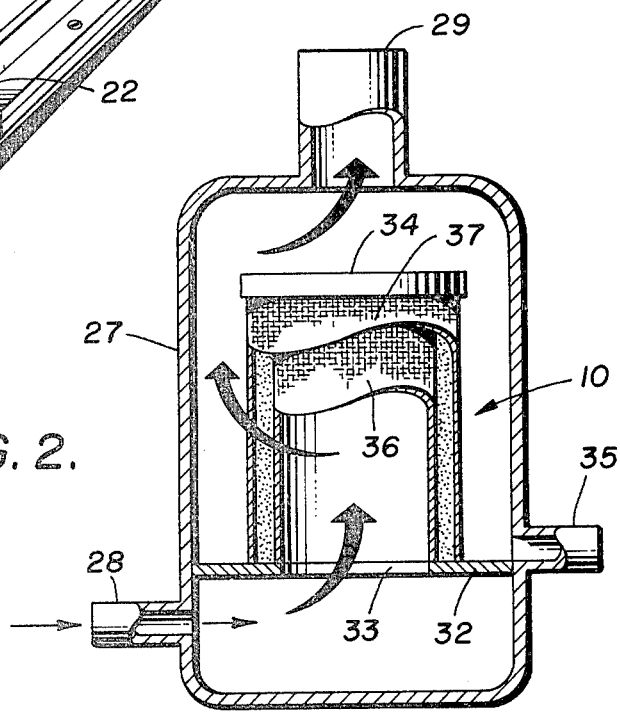
FIG. 2 is a schematic view showing an embodiment of the fiber bed element of this invention having a cylindrical configuration and apparatus used with the cylindrical element to remove aerosols from gas streams.

FIG. 2 shows an example of the fiber bed element 10 in a cylindrical configuration rather than the flat configuration of FIG. 1. The element is mounted in a vessel 27 having an inlet 28 for a gas to be treated and an outlet 29 for the treated gas. The element 10 is positioned on a plate 32 having an opening 33 through which the gas can enter the cylindrical element. A cap 34 prevents the gas from passing axially through the element and a drain 35 is provided for removal of collected aerosol.

In this embodiment of the invention a bed of staple fibers is packed in the annulus formed by concentric wire mesh screens 36 and 37 of a well-known type. This assembly can best be formed by positioning the roving 25 on the inner screen 36 with the roving extending in a direction generally parallel to the axis of the inner screen. The optional outer screen 37, which is split longitudinally, is then wrapped around the roving and the optional inner screen to compact the roving to the desired packing density and is then secured in any convenient manner.

In FIG. 2, the gas flow is shown as being from the care of the cylindrical element radiantly outwardly through the fiber bed which advantageously lowers the bed velocity of the gas as it leaves the periphery of the element. However, if desired, the gas flow can be the opposite; i.e., from outside of the element inwardly to the core.

Figure 3:
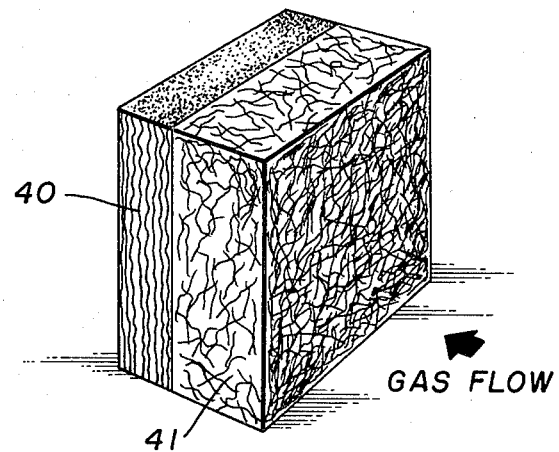
FIG. 3 is an enlarged fragmentary view of a fiber bed element having a downstream drainage layer of generally vertical fibers in contact with an upstream collecting layer of randomly distributed fibers.

FIG. 3 shows another embodiment of the fiber bed element. In this embodiment a drainage layer 40 of generally parallel fibers with interfiber passageways and interlayer passageways, as described above, is positioned in contact with a conventional collecting layer 41 of randomly distributed fibers. The fibers in the layer 41 do not extend in any one direction, but extend randomly in all directions. The aerosol droplets are collected in a layer 41 and are urged by the moving gas toward the layer 40 of generally vertical fibers. The generally vertical orientation of the fibers in the layer 40 enhances drainage to improve collection efficiency.

Since conventional fiber bed 41 is intended in this embodiment to provide the primary collection of particulates, drainage layer 40 is advantageously of coarser fibers. For example, if the mean fiber diameter of collecting fiber bed 41 is 2 to 15 microns for high efficiency collection of submicron particulates, drainage layer 40 is advantageously of 20 to 75 micron mean diameter fibers.

If the mean fiber diameter of collecting fiber bed 41 is 20 to 75 microns (the so-called high volume mist eliminator type) the fibers of drainage layer 40 may advantageously be 100 to 300 microns mean diameter.

In the embodiment where the fibers making up drainage layer 40 have a mean diameter of about 15–75 microns, they are preferably packed to a density of about 80 to 320 Kg per cubic meter. The randomly-distributed fibers making up the layer 41 having a mean diameter in the range of about 2–15 microns are preferably packed to a density of about 80 to 320 Kg per cubic meter. The packing density of the fibers in the collecting layer 41 is preferably greater than the packing density of the larger fibers in the drainage layer of 40. Different packing densities under the influence of a single packing force is achievable because of the greater stiffness of the fibers in the layer 40. The thickness of the downstream drainage layer 40 may be about 6 to 20 millimeters, with the collection layer 41 being 2 to 5 times this thick.

A flat fiber bed element, as shown in FIG. 1, was made up of glass fibers packed to a density of about 170 Kg per cubic meter and having a mean fiber diameter of 8 microns, the bed of fibers being about 5 cm. thick. A stream of air containing a sulfuric acid mist was passed through the element at various velocities and gas loadings. The operation was carried out with the fibers in both horizontal and vertical orientations. Table 1 shows the improved efficiencies obtained when the generally-parallel fibers were oriented vertically.

TABLE I

| Run No. | Fiber Direction | Inlet Mist Gas Loading (mg. 100%) $H_2SO_4/M^3$ | Inlet Mass Mean Particle Size (microns) | Gas Velocity (MPM) | Re-entrainment (mg. 100% $H_2SO_4$ >3 microns/$M^3$ | Total Efficiency % |
|---|---|---|---|---|---|---|
| A | Horizontal | 1547 | 0.71 | 14.03 | 41.3 | 97.2 |
| B | Vertical | 1600 | 0.77 | 13.49 | 2.5 | 99.7 |
| C | Vertical | 1600 | 0.77 | 13.46 | 4.9 | 99.5 |
| D | Horizontal | 1907 | 0.82 | 12.8 | 20.1 | 98.9 |
| E | Horizontal | 1907 | 0.82 | 12.8 | 30.7 | 98.3 |
| F | Horizontal | 1978 | .34 | 11.6 | 25.1 | 98.6 |
| G | Horizontal | 1978 | .34 | 11.6 | 24.0 | 98.6 |
| H | Vertical | 1960 | .32 | 10.8 | 3.9 | 99.5 |
| I | Vertical | 1960 | .32 | 10.8 | 4.9 | 99.4 |

From this, it can be seen that re-entrainment of collected mist was significantly reduced when the fibers were in a vertical orientation, resulting in an improved collection efficiency.

What is claimed is:

1. A fiber bed element for removing aerosols from a moving stream of gas, comprising a bed of fibers having a substantial portion of the voidage between the fibers of the fiber bed extending, with substantial continuity, in a generally vertical direction and a collecting layer wherein said fibers within said bed of fibers, hereinafter referred to a said drainage layer, have a mean diameter of 15–75 microns, said drainage layer being positioned in contact with said collecting layer, said collecting layer having randomly-oriented fibers having a mean diameter of 2–15 microns and being packed to a density greater than the packing density of the fibers in said drainage layer.

2. The element of claim 1 wherein the fibers are made of glass.

3. The element of claim 1 wherein the fiber bed element is cylindrical in configuration, said bed of fibers forming an annulus with a majority of the fibers extending in a direction generally parallel to the longitudinal axis of the element.

4. The element of claim 1 wherein the element has a generally flat configuration.

5. A fiber bed element for removing aerosols from a moving stream of gas, comprising a bed of fibers having a substantial portion of the voidage between the fibers of the fiber bed extending, with substantial continuity, in a generally vertical direction and a collecting layer wherein said fibers within said bed of fibers, hereinafter referred to as said drainage layer, have a mean diameter of 75–300 microns, said drainage layer being positioned in contact with said collecting layer, said collecting layer having randomly-oriented fibers having a mean diameter of 20 to 75 microns.

6. The element of claim 5 wherein the element has a generally flat configuration.

7. The element of claim 5 wherein the element has a cylindrical configuration.

8. A method of removing aerosols from a gas, comprising:
   a. providing a fiber bed element comprising a bed of fibers having a substantial portion of the voidage between the fibers of the fiber bed extending, with substantial continuity, in a generally vertical direction,
   b. passing the gas through the element substantially normal thereto at a predetermined velocity.

9. The process of claim 8 wherein the fibers have a mean diameter of 2 to 75 microns.

10. The process of claim 9 wherein said fiber bed element and a collecting layer of fibers is provided, said fiber bed element being in contact with the downstream surface of said collecting layer of fibers, said fibers in said collecting layer being randomly distributed and having a smaller mean diameter.

* * * * *